United States Patent [19]

Katz et al.

[11] Patent Number: 4,554,626
[45] Date of Patent: Nov. 19, 1985

[54] DIGITAL DATA PROCESSING SYSTEM

[75] Inventors: Lawrence H. Katz, Oregon City, Oreg.; Douglas M. Wells, Chapel Hill, N.C.; Richard G. Bratt, Wayland, Mass.

[73] Assignee: Data General Corporation, Westboro, Mass.

[21] Appl. No.: 642,732

[22] Filed: Aug. 20, 1984

Related U.S. Application Data

[63] Continuation of Ser. No. 266,531, May 22, 1981, abandoned.

[51] Int. Cl.⁴ .............................................. G05F 9/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,611,307 | 10/1971 | Podvin et al. | 364/200 |
| 4,079,448 | 3/1978 | N'Guyen et al. | 364/200 |
| 4,395,757 | 7/1983 | Bienvenu et al. | 364/200 |

Primary Examiner—Raulfe B. Zache
Attorney, Agent, or Firm—Robert F. O'Connell

[57] ABSTRACT

A digital data processing system using process synchronization techniques which comprise processing await logic for suspending the execution of a program controlled by a process, virtual processor await logic for performing an await operation at the virtual processor level and for temporarily inhibiting the loading of state items for the execution of the program, virtual processor advance logic for performing an advance operation at the virtual processor level to cease the inhibition of the loading of such state items, and process advance logic for causing the processor of the system to resume execution of the suspended program which is under control of the process.

12 Claims, 2 Drawing Figures

DIGITAL DATA PROCESSING SYSTEM

This application is a continuation of application Ser. No. 266,531, filed May 22, 1981, now abandoned.

CROSS REFERENCE TO RELATED APPLICATIONS

The present patent application is related to other patent applications assigned to the assignee of the present application.

BACKGROUND OF THE INVENTION

1. Field of the Invention

The present invention relates to a digital data processing system and, more particularly, to a multiprocess digital data processing system suitable for use in a data processing network and having a simplified, flexible user interface and flexible, multileveled internal mechanisms.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another user or procedure having such access rights.

Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only with a user's program. These addresses must be translated into logical and physical addresses within a data processing system each time a program is executed, and must then be frequently retranslated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing system's instruction structure includes both the instructions for controlling system operations and the means by which these instructions are executed. Conventional data processing systems are designed to efficiently execute instructions in one or two user languages, for example, FORTRAN or COBOL. Programs written in any other language are not efficiently executable. In addition, a user is often faced with difficult programming problems when using any high level language other than the particular one or two languages that a particular conventional system is designed to utilize.

Yet another problem in conventional data processing systems is that of protecting the system's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The digital data processing system of the present invention can be used in a multiprogramming context and includes processing means for executing programs in response to one or more processes and a virtual processor means temporarily bound to a process and containing state items to permit execution of a program under control of a process. The system further includes process synchronization means comprising process await means for performing a process level await operation to suspend the execution of a program controlled by a process. Virtual process level await means respond to the process level await operation and temporarily inhibit the loading of state items required to execute the program. A virtual process level advance means responds to the occurrence of an event and ceases the inhibition of the loading of such state items and process level advance means respond thereto to cause the processing means to resume the execution of the suspended program which is under the control of the process.

It is thus an object of the present invention to provide an improved data processing system.

It is another object of the present invention to provide a data processing system capable of use in large, interconnected data processing networks.

It is yet another object of the present invention to provide an improved addressing mechanism suitable for use in large, interconnected data processing networks.

It is a further object of the present invention to provide an improved information protection mechanism.

It is still another object of the present invention to provide a simplified and flexible user interface to a data processing system.

It is yet a further object of the present invention to provide an improved mechanism for referring to operands.

It is a still further object of the present invention to provide an instruction structure allowing efficient data processing system operation with a plurality of high level user languages.

It is a further object of the present invention to provide data processing internal mechanisms protected from user interference.

It is yet another object of the present invention to provide a data processing system having a flexible internal structure capable of multiple, concurrent operations.

Other objects, advantages and features of the present invention will be understood by those of ordinary skill in the art, after referring to the following detailed description of the preferred embodiments and drawings wherein:

Figure 1:
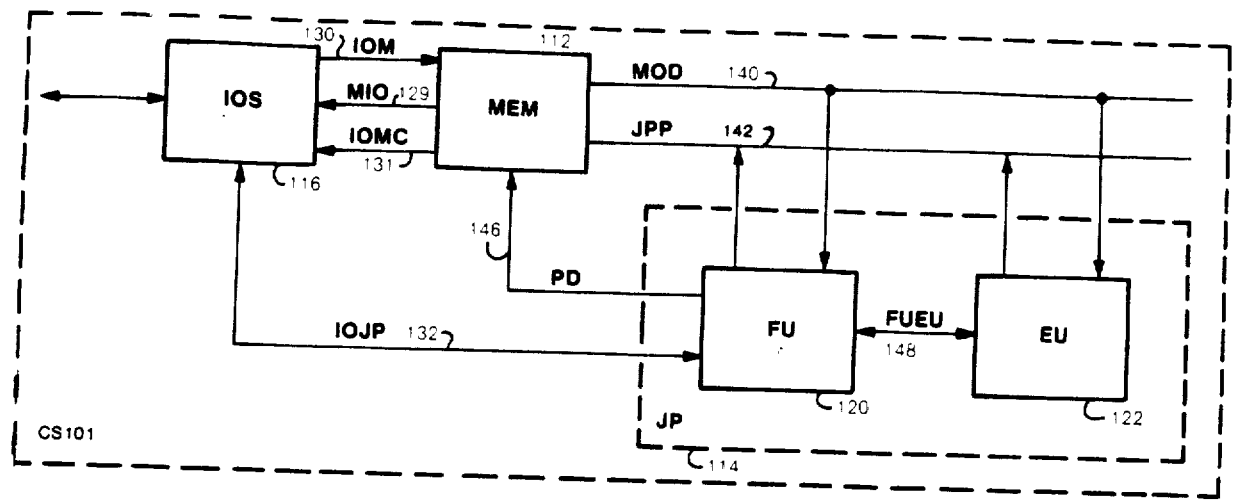
FIG. 1 is a partial block diagram of a computer system incorporating the present invention.

This application incorporates by reference the entire application, Ser. No. 266,402, filed on May 22, 1981, of Baxter et al., now issued as U.S. Pat. No. 4,455,602, on June 19, 1984.

More particularly, attention is directed to FIGS. 8, 12, 13, 15, 245, 248, 255, 402, 447 et seq. of the drawings in application Ser. No. 266,402, and to that part of the descriptive portion of the specification, particularly at pages 66–67, 74–75, 77–80, 109–110, 486 et seq., 557 et seq., and 900 et seq. thereof, which relate to the subject matter of the claims herein.

We claim:

1. In a multiprogramming data processing system which includes processing means for executing programs in response to processes which control the execution of said programs and virtual processor means temporarily bound to a process and containing state items for permitting said processing means to execute a program under control of said process, said system including process synchronization means comprising processing await means for performing a process level await operation to suspend the execution of a program which is controlled by a process;

virtual processor await means responsive to said process level await operation for performing a virtual processor level await operation and for temporarily inhibiting the loading of state items required for the execution of said program into said processing means;

virtual processor advance means responsive to the occurrence of an event for performing a virtual processor level advance operation to cease the temporary inhibition of the loading of the state items of said process into said processing means; and process advance means responsive to said virtual processor level advance operation for causing said processing means to resume the execution of the suspended program which is under the control of said process.

2. In a multiprogramming data processing system according to claim 1 wherein said processing means can be used to execute programs controlled by a plurality of processes and said system includes a plurality of virtual processor means, the number of said plurality of virtual processor means being less than the number of said plurality of processes.

3. In a multiprogramming data processing system according to claim 1 wherein said process synchronization means includes a plurality of event counters; and said virtual processor advance means responds to the operation of an event counter which signifies the occurrence of said event to cease the inhibition of the loading of said state items; and said process advance means responds to another event counter which signifies the operation of said virtual processor advance means.

4. In a multiprogramming data processing system according to claim 3 wherein said plurality of event counters includes private event counters and the event counter to which said virtual processor advance means responds is a private event counter and said another event counter to which said process advance means responds is an event counter other than a private event counter.

5. In a multiprogramming data processing system according to claim 4 wherein said virtual processor await means receives a value associated with said private event counter and said virtual processor advance means increments the value of said private event counter and, if said private event counter value is not less than the values specified by said received values, said virtual processor advance means performs said virtual processor level advance operation.

6. In a multiprogramming data processing system according to claim 5 wherein said process advance means causes said processing means to increment said another event counter and, if the value of said another event counter is not less than a specified value associated with said another event counter, said process advance means performs said process level advance operation.

7. In a multiprogramming data processing system according to claim 1 and further wherein said process synchronization means includes process manager process means responsive to an interrupt signal received by said processing means for identifying the source of said interrupt signal and for identifying the operating process with which said source is associated for the execution of a program under control of said operating process;

the process advance means of said operating process responding to said process manager process means for permitting said operating process to control the execution of a program for handling the interrupt operation required by said interrupt signal in synchronization with the execution by said processing means of other programs under control of other operating processes.

8. In a multiprogramming data processing system according to claim 7 wherein said interrupt signal is received by said processing means from an input/output device at an input/output channel in communication with said processing means, said process manager process means identifying said input/output device.

9. In a multiprogramming data processing system according to claim 7 wherein said interrupt signal is received in response to a clock related event at which a program under control of a specified process is to be executed.

10. In a multiprogramming data processing system according to claim 9 wherein said process manager process means identifies the specified process which is to control the execution of the program to be executed at said clock related event.

11. In a multiprogramming data processing system having processing means for executing programs in response to processes which control the execution of said programs and means for synchronizing the execution of programs under control of a plurality of processes, said system including means in said processing means for responding to an interrupt signal received from a source external to said data processing system, said synchronizing means including means responsive to said received interrupt signal for identifying the event which is associated with the external source producing said received interrupt signal, and means for permitting the interrupt program operation required by said interrupt signal to be executed by said processing means only under control of the process authorized to respond to said event in synchronization with the execution of programs under control of other processes.

12. In a multiprogramming data processing system according to claim 11 wherein said external source is an input/output device communicating with said processing means via an input/output channel.

* * * * *